United States Patent [19]

Kolodziejczyk

[11] Patent Number: 5,430,406

[45] Date of Patent: Jul. 4, 1995

[54] METHOD AND APPARATUS FOR MEASUREMENT OF TIME INTEGRALS OF EXPONENTIALLY DECAYING PULSES

[75] Inventor: Janusz Kolodziejczyk, Aalborg, Denmark

[73] Assignee: ADAC Laboratories, Inc., Milpitas, Calif.

[21] Appl. No.: 339,660

[22] Filed: Nov. 15, 1994

Related U.S. Application Data

[63] Continuation of Ser. No. 71,865, Jun. 2, 1993, abandoned, which is a continuation of Ser. No. 956,935, Oct. 2, 1992, abandoned, which is a continuation of Ser. No. 617,698, Nov. 26, 1990, abandoned.

[30] Foreign Application Priority Data

Dec. 22, 1989 [DK] Denmark .................. 6578/89

[51] Int. Cl.$^6$ ............. G06G 7/64; G06F 7/556; G01T 1/20; G01J 1/42
[52] U.S. Cl. .................. 327/336; 327/339; 327/346; 250/369; 250/395
[58] Field of Search ............. 328/127, 22, 109; 307/261, 529, 234; 342/149; 250/369, 395; 327/336, 346, 514, 339

[56] References Cited

U.S. PATENT DOCUMENTS

| | | | |
|---|---|---|---|
| 4,051,373 | 9/1977 | Hatch | 250/369 |
| 4,455,616 | 6/1984 | Inbar | 250/369 |
| 4,535,242 | 8/1985 | Dirkse et al. | 250/369 |
| 4,629,895 | 12/1986 | Mestais et al. | 250/369 |
| 4,672,542 | 6/1987 | Roux et al. | 250/369 |
| 4,719,464 | 1/1988 | Gendreu | 342/149 |
| 4,864,140 | 9/1989 | Rogers et al. | 250/369 |
| 4,866,400 | 9/1989 | Britton, Jr. et al. | 250/369 |
| 4,952,808 | 8/1990 | Turnbull et al. | 250/332 |

Primary Examiner—Timothy P. Callahan
Assistant Examiner—Trong Phan
Attorney, Agent, or Firm—Blakely, Sokoloff, Taylor & Zafman

[57] ABSTRACT

The circuit is adapted for integration of pulse signals of the shape $U(t)=U_0\exp(-t/\tau)$, wherein the time constant $\tau$ can be determined in advance by a calibration measurement, in particular signals from a scintillation detector. The purpose is to treat pile-up phenomena, without measuring the integration time, wherein the measured integral is corrupted because the time distance between two pulses becomes smaller than the integration time for the first pulse. The circuit comprises an integrator (4, 5, 6, R, C) for the pulse signal and a summator (3, $R_1$-$R_3$) for forming a weighted sum of the pulse signal (on 1, 2) and the integrated signal (from 4, 5), the weight of the pulse signal and the weight of the integrated signal having such a relation to each other that the result signal (on 8) is proportional to the sum of the time integral of the pulse signal and $\tau$ times the pulse signal. The circuit implements the equation $$I_\infty = \int_0^\infty U_0\exp(-t/\tau)dt = \tau U_0 = \tau U(t_1) + \int_0^{t_1} U_0\exp(-t/\tau)dt.$$

The output signal is generated in a time significantly shorter than the time constant $\tau$ and is independent of time, except for the risetime necessary. Accordingly the measurement can be interrupted anytime, for example at the detection of pile-up, without necessitating a succeeding conversion calculation on the basis of the actual integration time.

15 Claims, 4 Drawing Sheets

METHOD AND APPARATUS FOR MEASUREMENT OF TIME INTEGRALS OF EXPONENTIALLY DECAYING PULSES

This is a continuation of application Ser. No. 08/071,865, now abandoned, which is a continuation of Ser. No. 07/956,935, filed Oct. 2, 1992, now abandoned, which is a continuation of Ser. No. 07/617,698 filed Nov. 26, 1990, now abandoned.

TECHNICAL FIELD OF THE INVENTION

The invention relates to a circuit for processing pulse signals which decrease proportionally with $\exp(-t/\tau)$, exp denoting the exponential function, t denoting time and $\tau$ denoting a time constant which may be measured in advance in a calibration measurement. The circuit is used in particular for processing pulse signals from a scintillation detector or a similar detector for radiation pulses.

BACKGROUND OF THE INVENTION

In many signal processing applications it is desired to measure the time integral of the individual pulses. For example this is the case in the measurement of gamma radiation with a scintillation detector. Each gamma quantum induces a scintillation in a scintillator crystal, that is, an emission of light. The emission of light is detected with a photomultiplier tube whose output current is proportional to the light intensity received. The intensity, and thus the output signal of the photomultiplier tube, decreases exponentially with time. The time constant of this exponential decay is determined by the properties of the scintillator crystal and may, acordingly, be measured in a calibration measurement. The time integral of the signal from the single scintillation is proportional to the amount of energy which the gamma quantum has released in the scintillator crystal.

In gamma cameras which are used for generating an image of the radiation distribution from a radioactive isotope which, for example (for diagnostic purposes) is introduced into the blood circulation of a patient, a larger number of photomultiplier tubes is arranged in front of a flat scintillator crystal which is common for all tubes. How much each tube "sees" of the light from a scintillation in the crystal depends on the position of the scintillation in relation to the tube. This implies that it is possible by means of an analysis of the output signals of the tubes to determine the scintillation position. From this it is possible, using a suitable collimator for the gamma radiation, to determine the position of emission of the gamma quantum which triggered the scintillation, and thus to construct an image of the isotope distribution.

DESCRIPTION OF THE PRIOR ART

The required measurement of the time integral of the scintillation pulses may in principle be made with a (well-known) integrator circuit. In practice one lets the integrator operate for a certain time from the occurrence of an pulse, for example $3\tau$ or $5\tau$, and then reads out the output signal of the integrator at the end of this integration time. During the integration time the pulse signal decreases to a value so small that the remaining contribution to the integral is smaller than an error limit defined beforehand.

A problem occurs, however, when the time distance between the pulses becomes shorter than the integration time. That part of a succeeding pulse which occurs before the integration time for a first pulse has ended, enters linearly as an error into the integral value measured, which means that one must discard the measurement.

This well-known phenomenon which is denoted "pile-up" in the field of nuclear measurements, occurs in particular at high levels of radiation which are desired to achieve short measuring times. The pile-up phenomenon works against the desired shortening of the measuring time as it necessitates that one must discard measurements, but unfortunately it is unavoidable.

A way to work around this which is costly to go, however, is to shorten the integration time if a pile-up phenomenon is detected. This means that one reads out the integrator before the succeeding pulse disturbs the measured value. Then, however, one must measure how long the integration time has actually been to be able to calculate the desired integral—the value which would have resulted, had the integration time not been shortened. The calculation will require a multiplication or division operation with two variables which will be difficult and expensive to carry out precisely in analog circuitry, and which will be time-consuming in digital circuitry.

SUMMARY OF THE INVENTION

It is an object of the present invention to provide a circuit which is specifically adapted for processing a pulse signal of the kind mentioned initially, and wherein the integration time may in principle be shortened at will at the detection of a pile-up phenomenon, without necessitating a conversion calculation on the basis of the actual integration time.

In other words it is an object of the invention to provide a circuit which is specifically adapted for processing a pulse signal of the kind mentioned initially, and whose output signal is proportional to the time integral of the pulse signal, the output signal at the same time being independent of time except for a transient phase which is substantially shorter than the time constant $\tau$ of the pulse signal.

This object is attained, as a calculation in the following will show, with the circuit provided in claim 1, which is distinctive by its combination of an integrator for converting a pulse signal into an integrated signal which is proportional to the time integral of the pulse signal, with a summator for generating a result signal by forming a weighted sum of the pulse signal and the integrated signal, the weight of the pulse signal and the weight of the integrated signal having such a relation to each other that the result signal is proportional to the sum of the time integral of the pulse signal and $\tau$ times the pulse signal.

In the circuit according to the invention advance knowledge about the pulse signal, that is, about its functional behaviour and the time constant measured in the calibration measurement, is exploited to obtain the following advantages in the measurement of the time integral of the pulse signal:

1) the desired resultant is achieved in a time which is substantially shorter than the time constant $\tau$, that is, the measurement of the time integral of the pulse signal is—paradoxical as it may be—finished before the signal has passed its course in time, and
2) the output signal of the circuit, which indicates the measurement result, is independent of time, except for the transient set-up time which is necessary due to purely practical, component-related reasons. Thus the measurement can be interrupted at any time without necessitating a succeeding conversion calculation.

With the circuit according to the invention one can straight away measure the first of two (or more) pulse signals in a pile-up chain while with earlier circuits one was forced to discard the measurement.

Amongst the different possibilities of the implementation of a circuit according to the invention a design is preferred with a detector for detecting the occurrence of pulse signals, a reset circuit coupled to the detector and to the integrator which is operative to hold the integrated signal at zero level until a first pulse signal occurs, and then to release the integrated signal, and a readout circuit coupled to the detector and to the summator which is operative to read out the result signal at the occurrence of a next pulse signal, but before the result signal changes in response to a next pulse signal. Thus the integration always starts from a well-defined zero level such that one may exploit the dynamic range of the succeeding circuits in the best possible way.

This curcuit may be supplemented by a timer circuit which is coupled to the detector and to the readout circuit and operative to let the readout circuit read out the result signal if a predetermined time has passed from the occurrence of the first pulse signal without a next pulse signal having occurred. This enhances the number of measured pulses in relation to a circuit wherein one always waits for the next pulse signal to stop the measurement— inasmuch as the next pulse signal would then be used only to stop the measurement but would not be measured itself.

If it is desired only to measure the first pulse signal in a pile-up chain, one can adapt the reset circuit for resetting the integrated signal to zero after the readout circuit has read out the result signal. In principle, however, there is nothing to prevent the construction of a circuit wherein at the occurrence of the second pulse signal one reads out the value of the result signal without resetting it, and at the occurrence of a third pulse signal one reads off the result signal again. Then the measurement result for the second pulse signal can be found by forming the difference between the two readouts. The circuit would be somewhat more complicated but there may be circumstances under which one will accept this to obtain the higher measurement rate that can be obtained with such a circuit.

BRIEF DESCRIPTION OF THE DRAWING

The invention will be explained more closely in the following with reference to the drawing.

FIG. 2A shows a functional diagram for illustrating the principle implemented with the invention, while

DETAILED DESCRIPTION OF THE INVENTION

Figure 1:
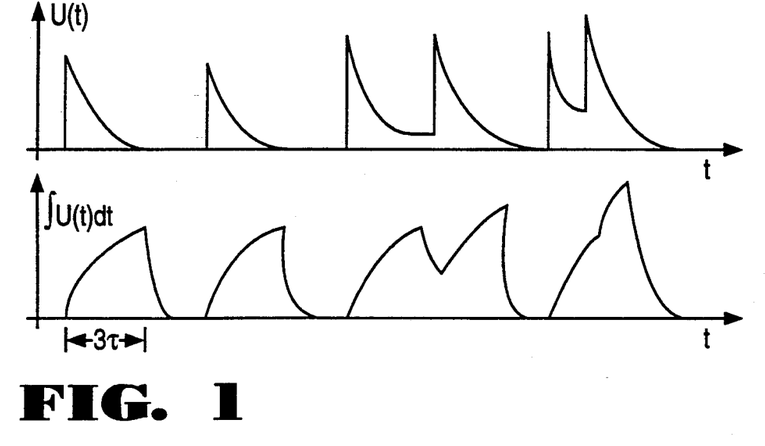
FIG. 1 shows various diagrams of exponentially decreasing pulse signals for illustrating the measurement problem forming the basis for the invention.

FIG. 1 shows various examples of how exponentially decreasing pulse signals, for example from a photomultiplier tube in a scintillation detector, appear in practice. The individual pulse signal, in the following denoted pulse, decreases in relation to $$U(t) = U_0 \exp(-t/\tau),$$

wherein t denotes time, $U(t)$ is the instantaneous amplitude of the pulse at the time t, $U_0$ is the initial amplitude ($t=0$) of the pulse and $\tau$ is the time constant of the pulse. Time, accordingly, is measured from the (very steep) rising edge of the pulse.

The invention originates from a situation wherein the time constant $\tau$ of all pulses is equal and may be determined in advance, for example by a calibration measurement. This is a situation occurring frequently. Assuming now that one wishes to find the time integral $I_\infty$ of the pulse, one finds $$I_\infty = \int_0^\infty U(t)dt = \int_0^\infty U_0 \exp(-t/\tau)dt = \tau U_0. \qquad (1)$$

As $\tau$ is known from the calibration measurement it should, accordingly, be sufficient to measure $U_0$. This measurement requires a fast and precise peak value detector, which is why this method can only be applied to pulses with a relatively large $\tau$.

For "fast" pulses having a $\tau$ in the range of 0.1–0.5 $\mu$s, which is a situation often arising in practice, an integrator circuit is used which measures an approximation of the value (1) indicated above.

If the pulses occur at a time distance so large that each pulse decreases almost to zero before the next one occurs, an integrator circuit can be used without any major problems. This is shown leftmost in FIG. 1. The upper half shows the pulses and the lower half shows the output signal of an integrator, with the assumption that the integrator is reset to zero after each measurement (which takes some time). One lets the integrator operate for example $3\tau$ or $5\tau$ and then reads it out and resets it to zero as the pulse will have decreased to a value so small that the remaining contribution to the integral will be below a predetermined error limit.

If the distance between the pulses is larger than the integration time but less than the time it takes to make a measurement and then to reset the integrator to zero, the measurement of the second one of two pulses becomes erroneous because the residual value of the integrator at the start of the second pulse enters into the result of the measurement. This is shown in the middle of FIG. 1. The measurement of the first pulse turns out correct, but the measurement of the second pulse must be discarded. The phenomenon is denoted pile-up and is well-known.

If the distance between the pulses is less than the integration time ($3\tau$ in FIG. 1), the measurement of the first impulse must also be discarded as the contribution from the second pulse corrupts the result entirely. This is seen rightmost in FIG. 1.

A way to work around this which is costly to go, however, is to shorten the integration time if a pile-up phenomenon is detected. This means that one reads out the integrator before the succeeding pulse distorts the measured value. In that case, however, one has to measure how long the integration time has actually been to be able to calculate the desired integral. The calculation will require a multiplication or division operation with two variables which will be difficult and expensive to carry out precisely in analog circuitry, and which will be time-consuming in digital circuitry.

The invention solves the pile-up problem in a different way which takes its starting point from the following observation.

Considering the sum $$S(t_1) = \tau U(t_1) + \int_0^{t_1} U_0 \exp(-t/\tau) dt \qquad (2)$$

we find that $$S(t_1) = \tau U_0 \exp(-t_1/\tau) + \tau U_0 - \tau U_0 \exp(-t_1/\tau) \qquad (3)$$

or $$S(t_1) = \tau U_0 = I_\infty.$$

It is seen that $S(t_1)$ is equal to the desired measurement result, namely, the time integral $I_\infty = \tau U_0$ of the pulse. The peculiar thing about this observation is that the result is independent of time. The result can also be cast in words as follows: The final value of the time integral may be obtained at any time by summing the instantaneous integrator value with $\tau$ times the instantaneous signal value.

Figure 2A:
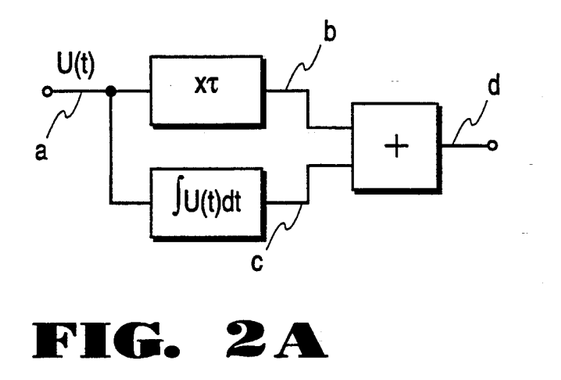
Figure 2B:
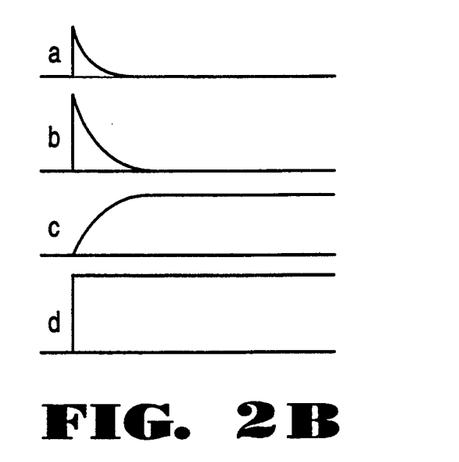
FIG. 2B shows corresponding signal waveforms.

This result is illustrated by way of a diagram in FIG. 2. In FIG. 2A, at the left, the individual operations—integration, multiplication and summation are symbolized, and in FIG. 2B, at the right, the resulting signals on the respective outputs from the operations can be seen. Notice the sum signal at the lower right of FIG. 2B which rises very steeply to the final or result value $I_\infty$. In actual circuits the risetime will be determined by the bandwidth of the components employed, which encompasses that the result will be present only after a certain minimal measurement time.

Figure 3:
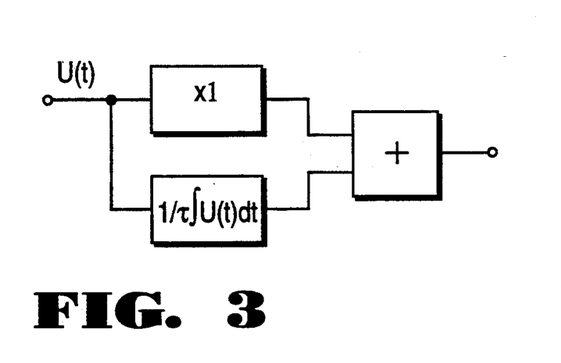
FIG. 3 shows an electronic block diagram for carrying out the functions according to FIG. 1.
Figure 4:
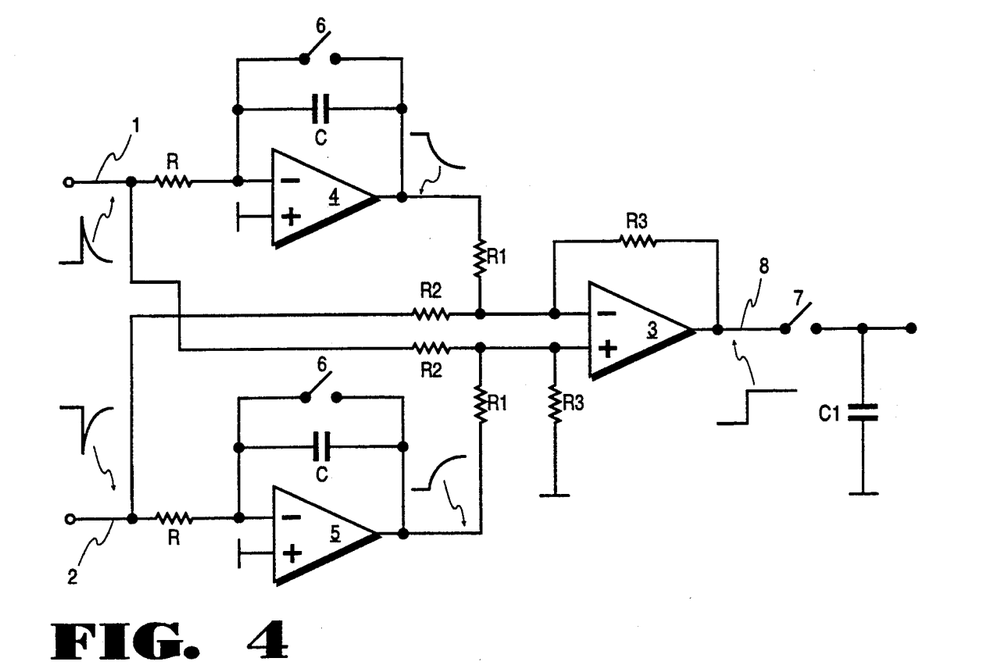
FIG. 4 shows a simplified diagram of a symmetric measurement circuit according to the invention.
Figure 5:
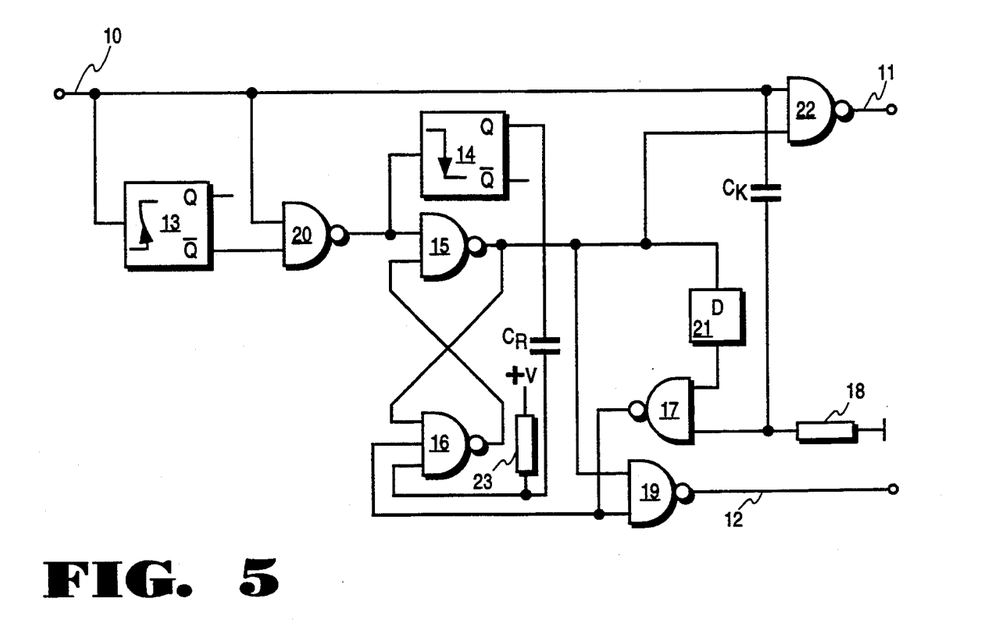
FIG. 5 shows a simplified diagram of a control circuit for controlling the switches shown in FIG. 3.
Figure 7:
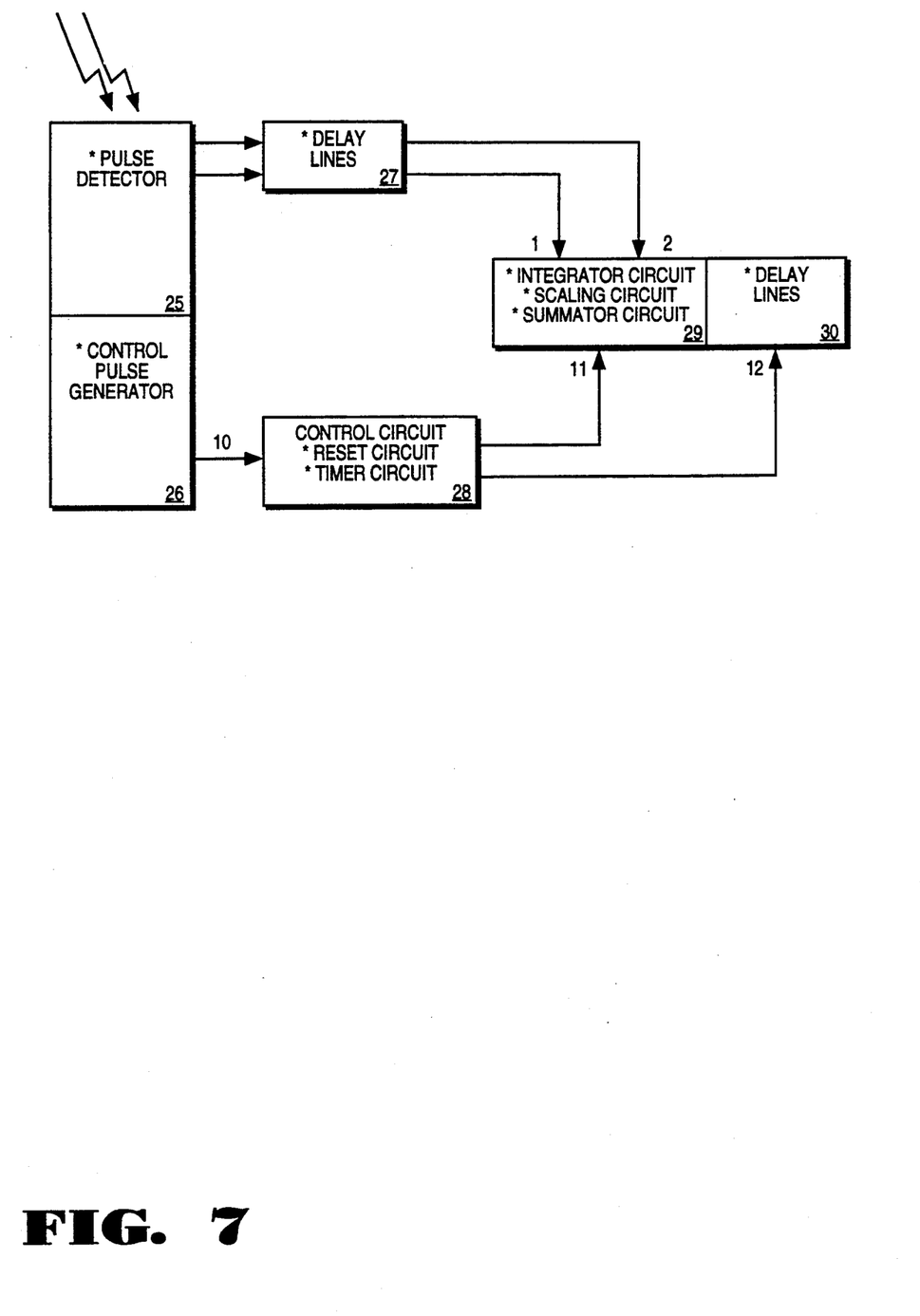
FIG. 7 shows a simplified block diagram for illustrating the invention.

The measurement method found is very easily cast into a circuit, for example as shown in FIG. 4. The circuit does not directly implement equation (2) but the modified equation—see FIG. 3—

$$(1/\tau)S(t_1) = U(t_1) + (1/\tau) \int_0^{t_1} U_0 \exp(-t/\tau) dt \qquad (5)$$
$$= U(t_1) + (1/\tau)I_1,$$

the observation being made that electronic integrator circuits usually provide a result of the form $$-(1/RC)\int f(t) dt,$$

that is, they naturally divide the integrated value by a time constant RC. The latter may then, as has been done in the present embodiment, be chosen to be equal to the value $\tau$ measured beforehand in the calibration measurement, which simplifies the explanation of the funtion of the circuit. In principle it is not necessary, however, to choose $RC = \tau$ inasmuch as it is only a scale factor; choosing a different value one would only have to make sure that $U(t_1)$ is scaled correspondingly so that the result is still proportional to the value given in equation (5). FIG. 7 is a simplified block diagram of an embodiment of the present invention. Pulse detector (25) detects radiation pulses. In Block (26), the detected pulses are converted into control pulses which are input into the reset/timer control circuit (28) via line 10. An embodiment of block (28) is shown in FIG. 4. The pulse detector (25) delivers copies of the detected signal to an integrator/scaling/summator circuit (29) via lines 1 and 2 (the detected signals are delayed by the delay lines (27) before block (29) receives the signals). The reset/timer control circuit (28) delivers control signals to blocks 29 and 30 via lines 11 and 12. An embodiment of blocks 11 and 12 is shown in FIG. 5.

In the diagram of FIG. 4 it is assumed that the pulse signals occur in a symmetrized form, that is, each pulse is converted into equal positive and negative signals on the input lines 1 and 2. The diagram shows a symmetric circuit with a summator constructed from an operational amplifier 3 and two equal integrators constructed from operational amplifiers 4 and 5. FIG. 4 includes small signal diagrams indicating the signal waveforms on the lines 1, 2 and 8 as well as on the outputs from the operational amplifiers 3 and 4.

Each integrator is equipped with a switch 6 in the feedback path; by closing the switch 6 the integration capacitor C is short-circuited, thus resetting to zero the output signal of the integrator—the capacitor is discharged. The integrator is started by opening the switch 6. The output signal of the integrator is equal to the expression (6) given above and thus equal to $(1/\tau)I_1$, wherein $\tau = RC$ is the product of the resistance R with the capacitance C as shown in FIG. 4.

The summator 3 is constructed with $R_1 = R_2$ and $R_3 = (\frac{1}{2})R_1$, that is, the summator divides the sum by 2.

The result is that the output signal $U_s(t_1)$ of the summator on line 8 becomes $$U_s(t_1) = \frac{U(t_1) + (-1/\tau)(-I_1)}{2} - \frac{(-1/\tau)I_1 - (-U(t_1))}{2} \qquad (7)$$
$$= U(t_1) + (1/\tau)I_1$$

or $$U_s(t_1) = (1/\tau)\tau U_0 = (1/\tau)I_\infty. \qquad (8)$$

Consequently the output signal of the circuit only needs to be multiplied by the scale factor $\tau$ to obtain the desired measurement result $I_\infty$.

In the discussion up to now we have not taken into account how the circuit works in case of pile-up. This will now be described.

While the integrators 4 and 5 are operating, the output signal of the circuit is continually transferred to the capacitor $C_1$, as the switch 7 is kept closed. The switch 7 is opened when the integration time has expired, or when a pile-up phenomenon is detected, that is, two pulses which have too short a distance in time to complete a full integration cycle. The capacitor $C_1$ in this connection serves as an analog memory for the output signal on line 8.

The switch 6 is closed, either at pile-up or at the termination of the integration time, to reset the integrators to zero in preparation for the next measurement.

The switches 6 and 7 are implemented as semiconductor circuits which are commercially available—so-called CMOS switches which can be controlled electronically. FIG. 5 shows a simplified diagram of a control circuit for these switches.

The control circuit (28) has an input terminal 10 for control pulses from a pulse detector (26). The pulse detector (26) generates a control pulse for each pulse signal occurring on the lines 1 and 2 in FIG. 4. Delay lines (27) are interposed between the pulse detector (25) and the circuit according to FIG. 4 so that the control circuit of FIG. 5 block 28 has time to convert the control pulses to control signals for the switches 6 on line 11 and the switch 7 on line 12, before the signals to be measured reach the measuring circuit of FIG. 4 blocks (29) and (30).

The correspondance between switch positions and logic states in the control circuit is that the switches are closed when the signals on lines 11 and 12 correspond to logic 0, and open when the signals correspond to logic 1.

It would carry too far here to go through all signal states of the control circuit, which is why only the quiescent state, the start of the circuit by the first control pulse received and the reaction of the circuit to a pile-up phenomenon shall be discussed.

Main elements and operation of the circuit are as follows:

The central elements are two monostable flipflops or timers 13 and 14, of which timer 13 is triggered by a rising pulse edge and timer 14 is triggered by a falling pulse edge. The two timers control a bistable flipflop built from two NAND circuits 15 and 16. The timer 13 serves to define a deadtime for the circuit while the timer 14 serves to define the integration time, which is a little less than the deadtime to account for the resetting time of the integrators.

Quiescent State

In the quiescent state the output signal from NAND circuit 15 is equal to 0, as well as the signal on line 10 is equal to 0, so that the switches 6 are held closed by line 11—the integrators 4 and 5 (FIG. 4) are held reset to zero. The one input of NAND circuit 17 is held at zero via the resistor 18, which is why its output signal is 1. Accordingly the NAND circuit 19 receives the signals 0 from NAND circuit 15 and 1 from NAND circuit 17 and therefore it passes logic 1 to switch 7 via line 12—the summator 5 is coupled off the capacitor C₁ in FIG. 4.

The timer 13 is in its quiescent state to that its output signal Q is logic 1 (in this text underlines are used instead of overbars as in the drawing), and the NAND circuit 20 passes logic 1 to the NAND circuit 15 as one of its inputs is on 0 from line 10. The NAND circuit 16 receives a 0 from the output Q of timer 14, which is in its quiescent state, and therefore passes a logic 1 to the other input of NAND 15.

Start by First Control Pulse

The control circuit is started by a short control pulse on line 10. The first thing happening is that the output signal of NAND 20 goes from 1 to 0 because the input signal combination becomes 1 and 1 for a short duration of time. This falling signal transition triggers the timer 14, whose output signal Q becomes 1. The control pulse also starts the timer 13, whose output signal Q becomes logic 0, but this happens after the control pulse has passed NAND 20. Succeeding control pulses on line 10 are prevented from passing through NAND 20 by a 0 on Q from timer 13.

The signal transition from 1 to 0 on one of the inputs of NAND 15 shifts the output signal of this circuit from 0 to 1. On the input of NAND circuit 16 this is combined with the signal value 1 on the input which is held at logic 1 via the resistor 23, and with the signal value 1 from NAND 17. Accordingly, also the output signal from NAND 16 changes state and becomes logic 0. Now the circuit is again in a stable state, and the signal on line 11 is now 1—the switches 6 are open, the integrators 4 and 5 are active, while the signal on line 12 is 0—switch 7 is closed, the summator 3 is coupled to the output capacitor C₁.

It should be remarked that the control pulse on line 10 is transferred to one of the inputs of NAND circuit 17 via the coupling capacitor. This encompasses a risk of an overlap with the output signal 1 from NAND 15—which then again would make the output signal of NAND 17 equal to 1 and prevent the change of state of NAND 16. This risk is avoided by interposing a suitable delay circuit between NAND 15 and NAND 17 as shown.

Stop by Control Pulse Occurring Before Timer 13 Times Out (Pile-up)

A control pulse occurring before the timer 13 times out must cause the signal on line 12 to be inverted first, to couple the summator 3 off the output capacitor C₁, after which the signal on line 11 is inverted to reset to zero the integrators 4 and 5. The control pulse cannot influence the bistable flipflop 15, 16 via the NAND circuit 20 because this signal path is held blocked by the timer 13, but it passes the coupling capacitor $C_k$ to one of the inputs of NAND circuit 17, which triggers the necessary changes of state in the circuit.

On the input of NAND circuit 17 the control pulse is combined with logic 1 from NAND 15, so that the output of NAND 17 goes to 0. This promptly causes the output of NAND 19 to go to logic 1—switch 7 is broken, summator 3 is coupled off the output capacitor C₁.

The NAND circuit 16 now also receives logic 0 from NAND 17 and changes state to logic 1, which is combined on the input of NAND 15 with logic 1 from NAND 20, so that the output signal of NAND 15 becomes logic 0. Via the OR circuit 22 this causes the signal on line 11 to go from 1 to 0, that is, the switches 6 in the integrators 3 and 4 are closed—the integrators are reset to zero. The signal path of this change is a little longer and accordingly it takes place a little later than the opening of switch 7.

Finally it should be remarked that a corresponding inversion of the signals on lines 11 and 12, in the same time sequence, occurs when the timer 14 times out, as this causes the timer's Q output to become logic 0. This change of state is transferred via the reset-coupling capacitor $C_R$ to one input of NAND 16, setting its output signal to 1, which triggers a state change as when a pile-up control pulse is received. When the timer 13 times out, the signal path through NAND 20 is opened again for a new start signal, upon which the circuit is in its quiescent state again.

As can be seen it is possible with a relatively simple control circuit to detect a pile-up phenomenon and interrupt the signal processing before the output signal from the measuring circuit according to FIG. 4 is corrupted.

Figure 6:
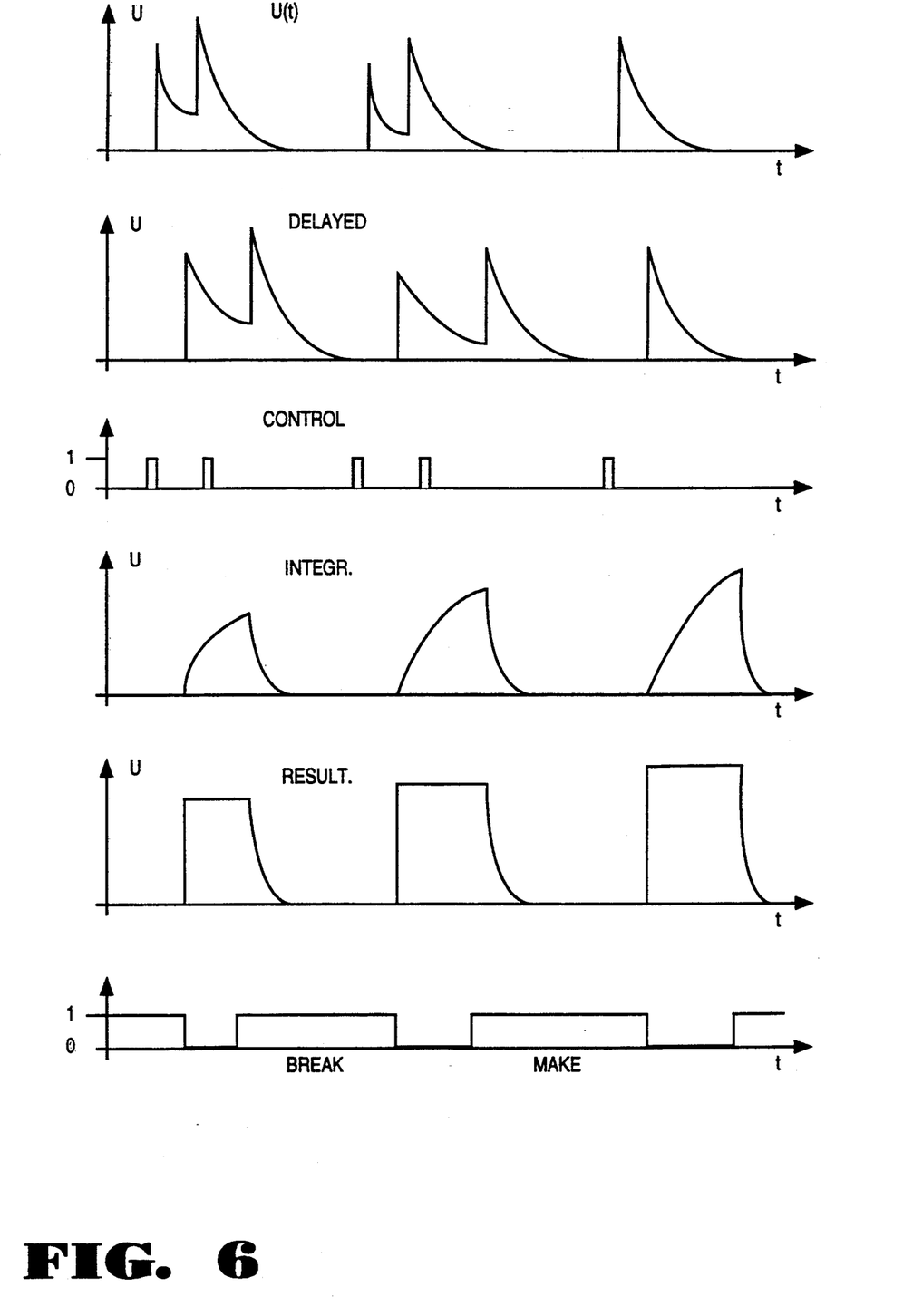
FIG. 6 shows in the form of signal diagrams how the control circuit cooperates with the measurement circuit.

FIG. 6 shows various signal diagrams to illustrate the cooperation between the control circuit and the measuring circuit. Uppermost the received pulse signals can be seen, for example from a scintillation detector, below the delayed signals can be seen which are received at the measuring circuit, and below those again the control pulses can be seen which are sent to the control circuit. The following two diagram lines show the output signal from the integrators 4/5, and the output signal from the summator 3—the result signal, and at the bottom the state of the switch 7 is shown. It is clearly evident that the integration time is variable if pile-up occurs.

What is claimed is:

1. A circuit for measuring a time integral of a first exponentially-decaying signal produced at an output of a pulse detector with the first exponentially-decaying signal followed by a second exponentially-decaying signal, said second exponentially-decaying signal produced at said output of said pulse detector, comprising:

a control pulse generator, coupled to the output of the pulse detector, for asserting a first control pulse in response to receipt of the first exponentially-decaying signal and for asserting a second control pulse in response to receipt of the second exponentially-decaying signal;

a reset circuit, coupled to an output of said control pulse generator, for asserting a reset signal at an output of said reset circuit, said reset circuit deasserting said reset signal in response to receipt of said first control pulse, said reset circuit reasserting said reset signal in response to receipt of said second control pulse;

an integrator, coupled to said output of said reset circuit and to the output of the pulse detector, for integrating a third signal generated by a third signal generation means being coupled to said integrator said third signal representing a time-delayed signal based on said first exponentially- decaying signal, said integrator providing a time integrated signal at an output of said integrator in response to a deassertion of said reset signal, said time-integrated signal being reset to a predefined value in response to an assertion of said reset signal; and said integrator further including a summator for summing said time integrated signal and said third signal to provide a result signal.

2. The circuit of claim 1, further comprising:

a readout circuit, coupled to said output of said control pulse generator and coupled to an output of said summator, for sampling said result signal in response to receipt of said first control pulse.

3. The circuit of claim 1, further comprising:

a timer, coupled to said output of said control pulse generator, for deasserting a disabling signal in response to receipt of said first control pulse, for asserting said disabling signal in response to receipt of said second control pulse, and for asserting said disabling signal after a predetermined period of time after said first control pulse; and a readout circuit, coupled to an output of said timer and to an output of said summator, for reading said result signal in response to said deassertion of said disabling signal.

4. The circuit of claim 1, wherein said predefined value is zero.

5. The circuit of claim 3, wherein said predetermined period is three times said t.

6. A circuit according to claim 2 further comprising a timer circuit coupled to the detector.

7. A circuit according to claim 6 wherein the reset circuit is arranged to reset the integrated signal to zero after the readout circuit has read out the result signal.

8. A method for measuring a time integral of a first exponentially-decaying signal produced at an output of a pulse detector, wherein the first exponentially-decaying signal is followed by a second exponentially-decaying signal, said second exponentially-decaying signal produced at said output of said pulse detector, the method comprising the steps of:

integrating the first exponentially-decaying signal only until detection of the second exponentially-decaying signal piled-up upon the first exponentially-decaying signal, to produce a time-integrated signal;

summing the first exponentially-decaying pulse and said time-integrated signal to produce a result signal;

sampling said result in response to receipt of the first exponentially-decaying signal.

9. A method for measuring a time integral of a first exponentially-decaying signal produced at an output of a pulse detector, wherein the first exponentially-decaying signal is followed by a second exponentially-decaying signal, said Second exponentially-decaying signal produced at said output of said pulse detector, the method comprising the steps of:

integrating the first exponentially-decaying signal only until detection of the second exponentially-decaying signal piled-up upon the first exponentially-decaying signal, to produce a time-integrated signal;

summing the first exponentially-decaying pulse and said time-integrated signal to produce a result signal;

sampling said result signal in response to a deassertion of a disabling signal, said disabling signal deasserted in response to receipt of the first exponentially-decaying, said disabling signal asserted in response to receipt of the second exponentially-decaying signal, and said disabling signal asserted in response to expiration of a predetermined period of time after the receipt of said first exponentially-decaying signal.

10. The method of claim 9, wherein said predetermined period of time is three times a decay constant $\tau$ of said first exponentially-decaying signal.

11. A method for measuring a time integral of a first exponentially-decaying signal produced at an output of a pulse detector, which is followed by a second exponentially-decaying signal that is piled-up upon the first exponentially-decaying signal, the method comprising the steps of:

detecting the first exponentially-decaying signal to produce a first control pulse;

detecting the second exponentially-decaying signal to produce a second control pulse;

time delaying said first exponentially-decaying signal to produce a time-delayed first exponentially-decaying signal;

integrating said time-delayed first exponentially-decaying signal in response to said first control pulse to produce a scaled time-integrated signal, said scaled time-integrated signal scaled by a first scaling factor;

resetting said scaled time-integrated signal to a predetermined value in response to said second control pulse; and summing said scaled time-integrated signal and time-delayed first exponentially-decaying signal to produce a result signal.

12. The method of claim 11, further comprising the step of:
sampling said result signal in response to receipt of said first control pulse.

13. The method of claim 11, further comprising the step of:
sampling said result signal in response to a deassertion of a disabling signal, said disabling signal deasserted in response to receipt of said first control pulse, said disabling signal asserted in response to receipt of said second control pulse, and said disabling signal asserted in response to expiration of a predetermined period of time after the receipt of said first control pulse.

14. The method of claim 13, wherein said predetermined period of time is three times said $\tau$.

15. The method of claim 11, wherein said predefined value is zero.

* * * * *